US011584198B2

(12) United States Patent
Zuberbuehler et al.

(10) Patent No.: US 11,584,198 B2
(45) Date of Patent: Feb. 21, 2023

(54) ADAPTER PLATE FOR AN AIR PURIFIER FOR USE IN VEHICLES

(71) Applicant: IQAir AG, Goldach (CH)

(72) Inventors: Christoph Zuberbuehler, Staad (CH); Frank Hammes, Horn (CH)

(73) Assignee: IQAIR AG, Goldach (CH)

( * ) Notice: Subject to any disclaimer, the term of this patent is extended or adjusted under 35 U.S.C. 154(b) by 549 days.

(21) Appl. No.: 16/596,958

(22) Filed: Oct. 9, 2019

(65) Prior Publication Data
US 2020/0114734 A1    Apr. 16, 2020

(30) Foreign Application Priority Data
Oct. 12, 2018    (EP) .................................... 18200042

(51) Int. Cl.
| | |
|---|---|
| *F01D 25/26* | (2006.01) |
| *B60H 3/06* | (2006.01) |
| *B01D 46/00* | (2022.01) |
| *B01D 46/24* | (2006.01) |
| *B01D 46/42* | (2006.01) |
| *F01D 25/28* | (2006.01) |

(52) U.S. Cl.
CPC ....... *B60H 3/0658* (2013.01); *B01D 46/0002* (2013.01); *B01D 46/0041* (2013.01); *B01D 46/0047* (2013.01); *B01D 46/2403* (2013.01); *B01D 46/4245* (2013.01); *F01D 25/285* (2013.01); *B01D 2273/30* (2013.01); *B01D 2279/40* (2013.01)

(58) Field of Classification Search
CPC ............. B60N 2/5635; B60N 2002/905; F24F 1/0071; F24F 2221/38; F24F 13/28; B03C 3/32

USPC ....................................................... 415/213.1
See application file for complete search history.

(56) References Cited

U.S. PATENT DOCUMENTS

| | | | | |
|---|---|---|---|---|
| 5,601,636 | A  * | 2/1997 | Glucksman | ............. H01T 23/00 55/471 |
| 6,773,477 | B2 | 8/2004 | Lindsay | |
| 10,029,797 | B2 * | 7/2018 | Space | ..................... B64D 11/06 |
| 10,899,259 | B2 * | 1/2021 | Krimmer | ............... B60N 2/815 |
| 10,933,722 | B2 * | 3/2021 | Abts | ...................... B60H 1/245 |
| 2002/0116789 | A1 * | 8/2002 | McDevitt | ........... F16M 11/2078 16/404 |

(Continued)

FOREIGN PATENT DOCUMENTS

| | | |
|---|---|---|
| CN | 106080122 A | 11/2016 |
| CN | 108482079 A | 9/2018 |

(Continued)

*Primary Examiner* — Long T Tran
*Assistant Examiner* — James J Kim
(74) *Attorney, Agent, or Firm* — Browdy and Neimark, P.L.L.C.

(57) ABSTRACT

An air purifier with mount for a vehicle, wherein the air purifier consists of a fan in a portable housing, which has at least one air intake region for sucking air into the housing and at least one air discharge region for blowing the air out of the housing, wherein a cleaned discharge air flow flows out into the passenger compartment, wherein the mount consists of an adapter plate that can be detachably fixed in different positions in the interior of the motor vehicle, and wherein the air purifier is rotatably mounted in the adapter plate.

10 Claims, 4 Drawing Sheets

(56) References Cited

U.S. PATENT DOCUMENTS

| | | | |
|---|---|---|---|
| 2009/0205498 A1* | 8/2009 | Wang | B01D 46/521 |
| | | | 95/279 |
| 2013/0181492 A1* | 7/2013 | Prescott | B60R 7/088 |
| | | | 297/217.1 |
| 2016/0167587 A1* | 6/2016 | Dry | B60R 11/02 |
| | | | 224/275 |
| 2019/0105458 A1* | 4/2019 | Hammes | F24F 1/02 |
| 2019/0160417 A1* | 5/2019 | Matsumoto | B60H 3/0633 |

FOREIGN PATENT DOCUMENTS

| | | |
|---|---|---|
| DE | 8226125 U1 | 5/1983 |
| DE | 3931914 A1 | 4/1991 |
| JP | 2003-525801 A | 9/2003 |
| JP | 2016-112300 A | 6/2016 |
| KR | 10-2010-0057322 A | 5/2010 |
| KR | 10-2012-0130811 A | 12/2012 |
| KR | 20130142451 A | 12/2013 |
| WO | 0006288 A1 | 2/2000 |
| WO | 0166258 A1 | 9/2001 |

\* cited by examiner

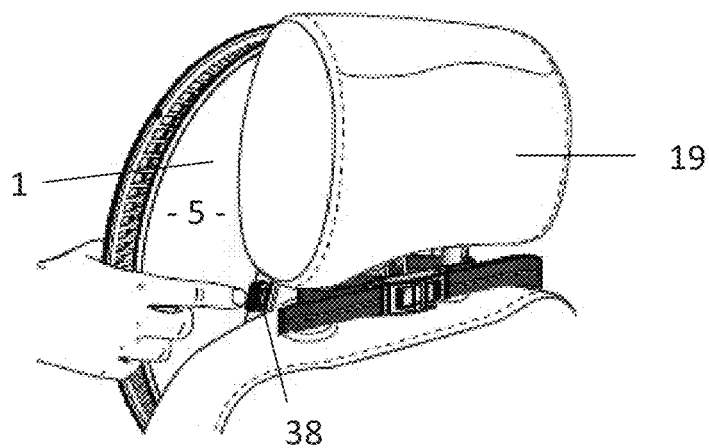
Fig. 10
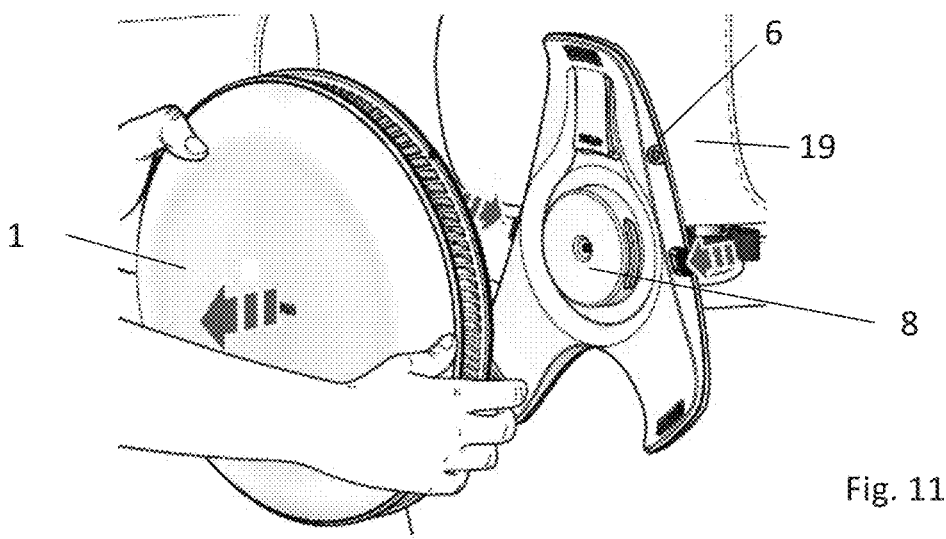
Fig. 11
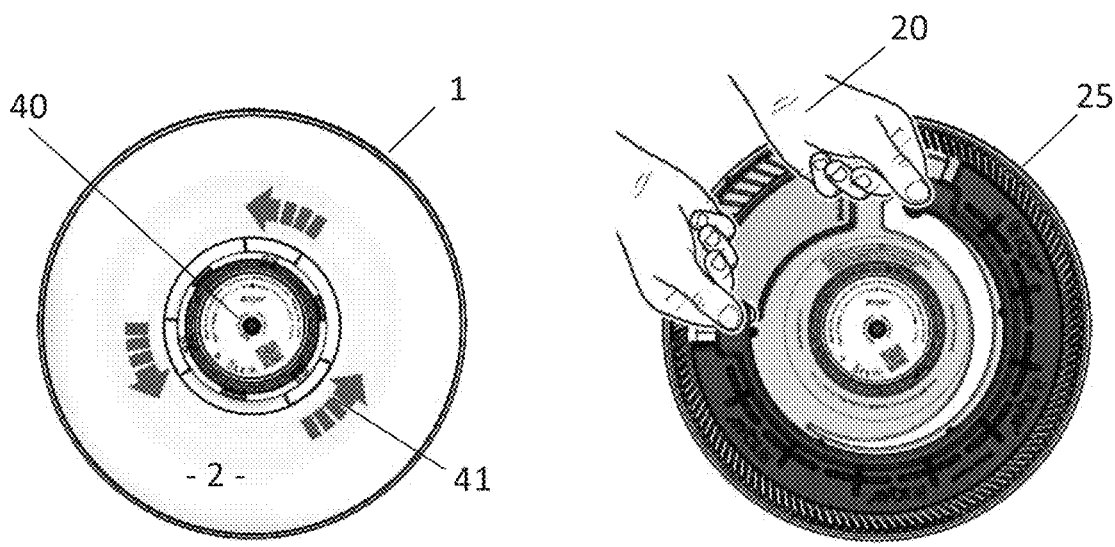
Fig. 12
Fig. 13

ADAPTER PLATE FOR AN AIR PURIFIER FOR USE IN VEHICLES

The invention relates to a portable air purifier with mount for an aircraft, watercraft, or land vehicle.

If the air in a vehicle contains an undesirably high level of particulate and/or gaseous air pollutants, a portable air purifier can be operated in order to purify the passenger compartment air. Moreover, it is possible to provide each of the passengers with individually adjusted and filtered air.

Such an air purifier is thus associated with the respective person and can feed a distinct, filtered air flow to a person—particularly to the facial region.

An air purifier for use in the interior of a motor vehicle is known, for example, from DE 82 26 125 U1. The air purifier shown here has a circular, disc-shaped housing and can be used in the passenger compartment without being associated with a specific passenger in the vehicle. The 12 V motor-driven centrifugal fan, which includes backward-curved blades, draws in the cabin air, pushes it through a filter layer around the fan, and then blows the filtered air through oblique circular plastic fins in the vehicle channels.

To supply the motor with electricity, the air purifier can be connected electronically to a suitable auxiliary power outlet of the motor vehicle.

The underside of the device is provided with a non-slip surface, so that slippage cannot occur even when the device is placed loosely on the rear seat bench.

Especially at high speeds, however, it is necessary that the air purifier be securely placed inside the vehicle so that it is not thrown uncontrollably through the interior of the vehicle in the event of a braking maneuver or collision. It is not possible to associate the device with a specific person.

DE 39 31 914 A1 also discloses an air purifier that can be operated in the interior of a vehicle. The air purifier is integrated for this purpose into the rear shelf, for which the rear window shelf has a corresponding opening into which the device is placed. It is therefore always necessary to modify the rear window shelf in order to mount the air purifier in the interior of the vehicle.

What is more, given the filters that are installed in the air purifier, it is necessary to be able to easily open the air purifier in order to remove the filter unit to clean it or install a new filter unit.

It is therefore the object of the invention to further develop an air purifier for a motor vehicle of the type mentioned at the outset in such a way that it can be securely fixed in the interior of the vehicle and, if necessary, easily removed from its location, and that it is also possible to associate it with a specific passenger in the vehicle.

The objects on which the invention is based are achieved by the features of the independent claim, with advantageous embodiments and developments of the invention following from the subclaims.

One advantageous feature is that the air purifier is rotatably mounted on an adapter plate that can be fixed in different positions in the interior of the motor vehicle.

Another feature is that the air purifier has a housing that corresponds roughly in size and shape to a discus disc of the type known as a throwing device used in athletic competitions.

It is characteristic of this shape that the air treatment and air discharge takes place in a relatively small, rotationally symmetrical housing, so that it is possible for the first time to affix such an air purifier to an adapter plate in the passenger compartment. The air purifier is mounted on this adapter plate so as to be rotatable about a central transverse axis.

The direction of the discharge flow can thus be altered by rotating the housing about the rotation axis of the fan. For instance, the discharge air flow can be directed against the ceiling of the vehicle.

This results in a change in the discharge air flow within wide limits, because the housing can be freely rotated in any desired angle of rotation over its rotation axis as defined by the adapter plate, with angles of rotation of 360 degrees being possible.

A provision is made for this purpose that the power supply for the housing-side fan and the rest of the electronics is arranged on the adapter plate, which engages in an opening of the device, so that the housing itself is wireless and powered via the adapter plate-side rotary power connector.

On the housing side, the rotary power connector consists of an annular sleeve that is arranged on one housing shell and in the central region of which a plug socket for the insertion of an adapter plate-side jack plug is arranged.

The adapter plate-side plug is located in the center region of the adapter plate-side coupling sleeve, and a power connection is thus established by plugging the adapter plate-side plug into the housing-side receiving bush or jack socket, which functions with two current conductors similarly to a jack plug connection.

Two fastening variants are preferred for the mounting of the adapter plate.

In a first fastening variant, the adapter plate is fastened to the head restraint bars with straps, whereupon the disc-shaped air purifier is mounted on the adapter plate on the back of the front seat.

The adapter plate offers the advantage that it has a coupling sleeve onto which the air purifier is placed and rotated about this coupling sleeve. This makes it possible to change the discharge region of the device and steer it in different directions in the passenger compartment in a targeted manner.

The invention is not limited to this, however. The kinematic inversion is also claimed with the present invention, meaning that the air purifier can have a coupling sleeve that engages and can be locked in an opening in the adapter plate.

Another feature is that such an air purifier is embodied in the form of a preferably rotationally symmetrical disc-shaped housing that now offers the possibility that the device can be rotated on an adapter plate in any manner about a horizontal or vertical axis of rotation in order to thus enable the user's body or regions of the passenger compartment to be targeted in a selective manner.

By virtue of this approximately disc-shaped design of the air purifier, it is now possible to arrange the air intake region and the air discharge region continuously around the circumference of the disc-shaped housing.

It is preferred if an angular range of 270 to 300 degrees over the circumference of the housing is allocated to the air intake region, for example, and if an angular range in the range of only between 60 to 90 degrees is assigned to the air discharge region, for example. This offers the advantage that the air intake region extending over an angular range of preferably 270 to 300 degrees over the circumference of the housing is now formed over a large area, and a corresponding C-shaped filter can be arranged in the entire air intake region that also extends around the angular range of preferably 270 to 300 degrees in the interior of the housing.

A discharge chamber into which the fan wheel blows the air on the path toward the air discharge region of the housing during operation is arranged in the portion left open by the filter unit.

A discharge filter that is optionally also connected to a scenting device can be arranged in the discharge chamber.

The device thus offers easy manageability with extremely shortened air ducts, because, according to another feature of the invention, the air intake region and the air discharge region are disposed on the same radial plane on the outer circumference of the housing—which offers the advantage that a very small overall width can be achieved.

The central transverse region of the approximately disc-shaped housing body spans a radial plane that extends from the center of the device radially outward in the direction of the outer circumference. Both the air intake region and the air discharge region are aligned on this radial plane and without axial offset relative to one another, which results in a small overall width.

It is thus possible to arrange an air discharge nozzle in a first peripheral region on the outer circumference of the housing with which the purified and possibly also scented exhaust air can be directed in a targeted manner to a region in the passenger compartment and to arrange the air discharge region in a second peripheral region on the outer circumference of the housing. Both regions are located in the same annular groove that is arranged on the outer circumference of the housing.

It is preferred if the discharge air flow is laminar, free of turbulence, and adjustable in its discharge strength in order to ensure that the user does not perceive the air flow as an annoyance.

Particularly when the discharge region is aimed at the ceiling of the motor vehicle, a kind of air curtain is formed that is distributed throughout the motor vehicle and is not perceived by the user as objectionable.

If the air purifier is mounted on the driver's head restraint, the air curtain that is directed toward the ceiling can be fed to the driver in a personalized manner.

The coupling sleeve of the adapter plate has a locking closure that makes it possible to hold the device securely and that can be easily opened by manual operation in order to detach the device from the adapter plate.

The locking closure is integrated into the coupling sleeve and has a release button on the back of the adapter plate that actuates at least locking jaw that is arranged radially on the outer circumference of the coupling sleeve, so that the at least one locking jaw is moved into the interior of the coupling sleeve and thus guided out of the locking projections of the air purifier. The one or more locking projections can be embodied as undercuts in the opening of the back plate.

As soon as there is no locking engagement, the device can be easily removed from the adapter plate.

When the device is set in place, a click sound is made when the locking jaws engage in the locking projections of the attached air purifier.

Another fastening variant makes a provision that the adapter plate is first fixed to the seat surface of a motor vehicle seat in order for the air purifier to be subsequently placed on it.

The adapter plate can be fixed to the seat belt on the seat, in which case the seat belt is first guided through a lug on the upper side of the adapter, whereupon the lock tongue of the seat belt is inserted into the seat belt buckle.

The present invention is not limited to the use of a seat belt for fixation; other detachable fastening means can also be used for fixation to the seating surface.

This adapter plate for placement on a seat also has the abovementioned locking closure in the coupling sleeve.

An additional feature of the invention is that a central current feedthrough is arranged in the coupling sleeve, whereby the device, which can be rotated freely on the coupling sleeve, can be supplied with power when in any position.

The pin-shaped current feedthrough is located in a central opening in the coupling sleeve and received in a contact socket in the interior of the positioned air purifier when the device is put in place.

The device can be connected to the electrical device of the motor vehicle, and it is provided with a switch and a switch light from which the switched-on state can be identified.

The filter used consists, for example, of fine dust filter fleece or activated carbon fleece and is placed in folded form around the fan located in the center. The folded shape has the effect of causing optimal air passage with minimal pressure loss. With only a few hand movements, the front panel of the device can be loosened in order to remove the bulging filter and insert a new filter.

In an advantageous embodiment, in order to turn the air purifier on, at least one finger is placed on the central region of the cover plate and slight pressure is applied, thereby turning the device on. With each touch of the the speed of the fan and thus the intensity of the outflowing air flow. The change in speed can occur haptically, by vibration, or visually, by different-colored lights of an integrated lamp, or acoustically, by means of a signal tone.

For instance, a weak blue light and a certain signal tone indicate a low speed of the fan, whereas a stronger blue light and a certain signal tone indicate an average speed, and a strong blue light and a certain signal tone indicate the maximum speed.

In the idle state, only a red light is visible, for example. If this red light flashes, this is an indication that the filter needs to be changed.

Other light elements help the user to generally identify that air is flowing from the device, since the air flow itself is not noticeable.

For this purpose, a provision is made that optically perceptible lighting elements are present on or in the discharge nozzle that light up only when a discharge air flow is actually being generated.

A common aspect of all embodiments is that a discharge air flow that is freely emitted from the housing of the air purifier can be directed individually to the user or to regions of the passenger compartment, and that this discharge air flow is purified at least by one or more filters and can also have additional properties.

A device for scenting the discharge air flow can also be provided. Likewise, a provision can be made that an ionizer is arranged in the interior of the device in order to enable ionized air to be emitted.

Accordingly, the invention relates to a personalized air purifier having a housing that has at least one air intake region for sucking air into the housing and at least one air discharge region for blowing the air out of the housing, with at least one fan wheel of the air purifier that can be rotated about a fan rotation axis and at least one intake air filter of the air purifier for filtering the air sucked through the air intake region being arranged in the housing, and the fan wheel blowing the air at least in one direction parallel to the fan rotation axis into the fan wheel during operation of the air purifier and in at least one direction radial to the fan rotation axis away from the fan wheel.

With the aforementioned features, a very low overall height (=disc thickness) is achieved if the fan wheel is arranged in an interior space that is partially surrounded by the intake air filter and the air intake region and air discharge region are arranged on the same radial plane on the outer circumference of the housing.

It is especially advantageous if the air intake region and the air discharge region, as seen from the fan rotation axis, are arranged on the radially outer edge of the housing. This makes it possible for the air intake region and the air discharge region to be arranged in the vicinity of an annular groove that is disposed in the center region of the housing on the outer periphery, which further reduces the overall height (=disc thickness).

Arranging the fan wheel in an interior space that is partially surrounded by the intake air filter interior and thus partially within the intake air filter enables a very compact design of the air purifier to be achieved. As a result, air purifiers are produced that are very easily transportable and also versatilely employable in the passenger compartment.

In preferred embodiments, the fan wheel has a plurality of air blades that are preferably arranged so as to be spaced apart from the fan rotation axis or at least extend in that direction.

These air blades can be arranged on a base surface of the fan wheel and protrude from this base in the direction parallel to the axis of rotation, preferably orthogonally. In preferred embodiments, the base surface is arranged so as to be orthogonal to the fan rotation axis.

Preferably, as viewed from the fan rotation axis, the air blades are aligned at an angle to the radial direction. In preferred embodiments, the fan or the fan wheel is embodied as a so-called backward-curved centrifugal fan.

In any case, the fan wheels of the air purifier according to the invention ensure that the fan wheel sucks the air into the fan wheel at least in one direction parallel to the fan rotation axis during operation of the air purifier and blow it away from the fan wheel in at least one direction radial to the fan rotation axis.

Air purifiers according to the invention can be used as room air purifiers in order to clean the air in a vehicle interior. However, preferred embodiments of air purifiers according to the invention make a provision that the cleaned air is blown out in a targeted direction or in a directional region.

Preferred embodiments of the invention make a provision that, as seen in a plan view from the direction parallel to the fan rotation axis, the intake air filter surrounds the interior space in which the fan wheel is arranged only incompletely.

Especially preferably, a provision is made, in turn, that—as viewed in the plan view from the direction parallel to the fan rotation axis—a discharge chamber is arranged in the portion left free by the intake air filter into which the fan wheel blows the air on its way to the air discharge region of the housing during operation.

This enables especially compact air purifiers to be constructed. Discharge air filters can be arranged in the discharge chamber of devices according to the invention. However, variants of an air purifier according to the invention are also conceivable in which the exhaust air filter in the discharge chamber is dispensed with. In simple terms, a provision is made in especially preferred embodiments of the invention that the discharge chamber and the air intake region are arranged on the same plane. This offers the advantage of a hitherto unknown reduction in overall height.

In a preferred variant of the invention, a provision is made that the air intake region of the housing is delimited by two imaginary, mutually parallel boundary planes and a or the discharge chamber into which the fan blows the air during operation on the way to the air discharge region of the housing, and/or or the air discharge region of the housing is or are arranged so as to be at least partially, preferably completely, between the parallel boundary planes. The boundary planes are preferably orthogonal or normal to the fan rotation axis.

Particularly for the purpose of freeing up the discharge chamber, preferred variants of the invention make a provision that the intake air filter does not completely enclose the interior space in which the fan wheel is at least partially disposed. To this end, preferred variants of the invention make a provision that the intake air filter is C-shaped. The term "C-shaped" is to be understood in the broad sense. The "C" can be bent or angular, etc. These are ultimately shapes of the intake air filter that surround said interior space but are not completely closed circumferentially.

Preferred variants of air purifiers according to the invention make a provision that, as seen from the direction parallel to the fan rotation axis, the housing has a circular outer contour. Overall, the housing can have a disc-shaped outer contour. The air intake region and/or the air discharge region can be arranged at the radially outer edge of the housing as viewed from the fan rotation axis. Preferably, a provision is made that the air intake region and the air discharge region are arranged in mutually different areas of the radially outer edge of the housing as seen from the rotation axis. A succession of fins can be respectively arranged both in the air intake region and in the air discharge region. Air can be sucked into the housing between the fins in the air intake region.

The air can be blown out of the housing between the fins in the air discharge region. The fins can be arranged at an angle relative to the radial direction as seen from the fan rotation axis both in the air intake region and in the air discharge region.

The air discharge region can be changed according to the invention by rotating the device about the rotation axis extending through the device and the adapter plate.

The inventive object of the present invention follows not only from the subject matter of the individual claims, but also from the combination of the individual claims among one another.

Any and all information and features disclosed in the documents, including the abstract, particularly the spatial design shown in the drawings, could be claimed to be essential to the invention insofar as they are novel individually or in combination in view of the prior art. The use of the terms "essential" or "inventive" or "essential to the invention" is subjective and does not imply that the features that are characterized as such must necessarily be part of one or more claims.

In the following, the invention will be explained in greater detail with reference to drawings, which illustrate only one manner of carrying out the invention.

Additional features and advantages of the invention that are essential to the invention follow from the drawings and their description.

In the drawing:

FIG. 10 shows schematized actuation of the locking connection;

FIG. 11 shows schematized lifting-off of the device;

FIG. 12 shows opening movement of the air purifying device in plan view; and

FIG. 13 shows removal of the filter unit in plan view.

Figure 1:
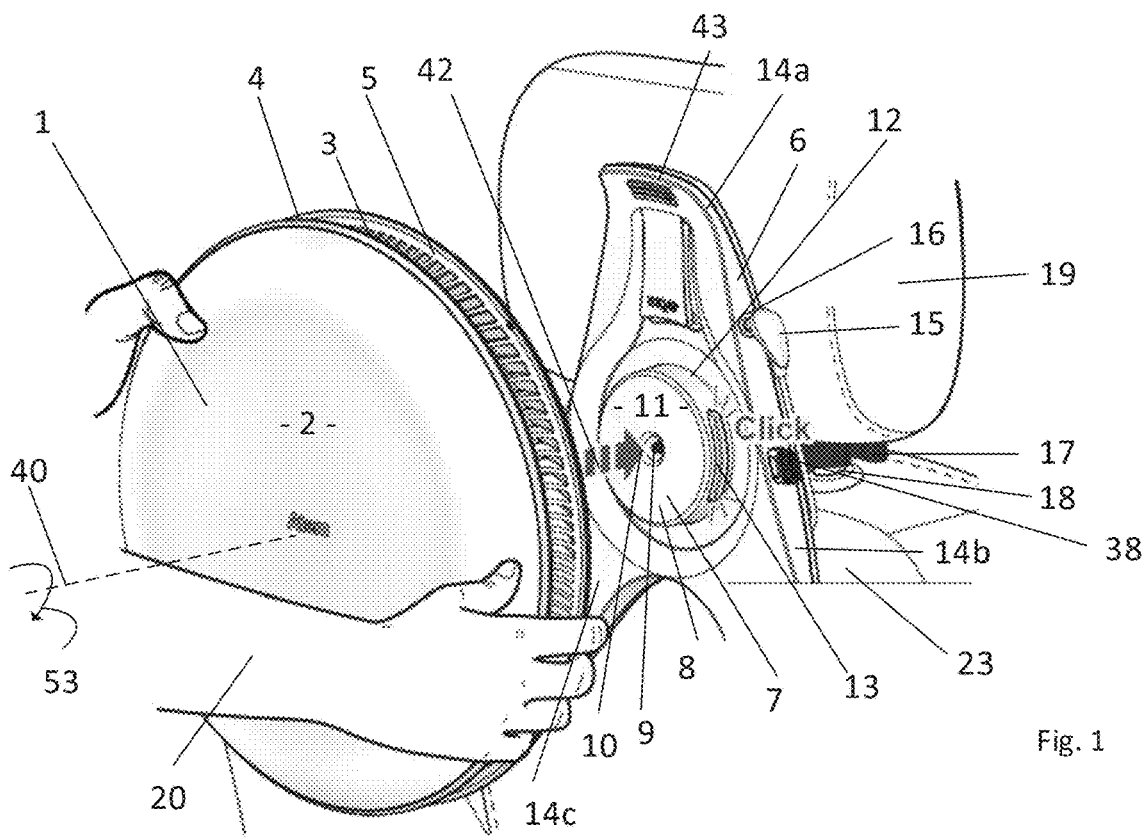
FIG. 1 shows a schematized process for the mounting of the device.

FIG. 1 shows an air purifier 1 that consists of a cover plate 2 as well as of a back plate 5 and an outer circumference 4 that is arranged between the front and rear plate and forms the side surface. A plurality of fins 3 are arranged so as to be distributed on the outer circumference 4 and act as air intake regions or air discharge regions depending on the air passage.

For instance, the intake air can be sucked into the device 1 in the radial direction over a circumferential region extending in the range of from 270-300 degrees, whereas the treated air can be expelled from the device 1 over a circumferential region extending in the range of from 60-90 degrees.

Accordingly, the air discharge region 50 (shown in FIG. 4) extends in an angular range of preferably 60-90 degrees, it being possible for the discharge direction 49 to be changed according to the invention by rotating the device 1 about the rotation axis 40.

The adapter plate 6 has a mounting portion 7, which consists of a coupling sleeve 8 with an opening 9 in the center in which a current-carrying pin that is embodied as a jack plug 10 is placed.

The positioned air purifier 1 can be supplied with the required voltage via this jack plug 10. This is a rotary connection for the power lines that are arranged there, so that the low current that is fed into the adapter plate 6 via the power cable 15 (FIG. 2) is fed into the coupling sleeve 8, in whose central region the bipolar jack plug 10 is arranged, which can be locked into an oppositely situated jack socket that is arranged in the vicinity of a housing-side opening 24. "Low current" is understood to refer to a voltage of 12 volts-24 volts and current of 1-2 amps, for example.

In this way, a complete rotation of the air purifier 1 about the rotation axis 40 in any desired angular range—even multiply about an angle of 360 degrees—in the direction of the arrow 53 is made possible while maintaining the power supply.

Figure 3:
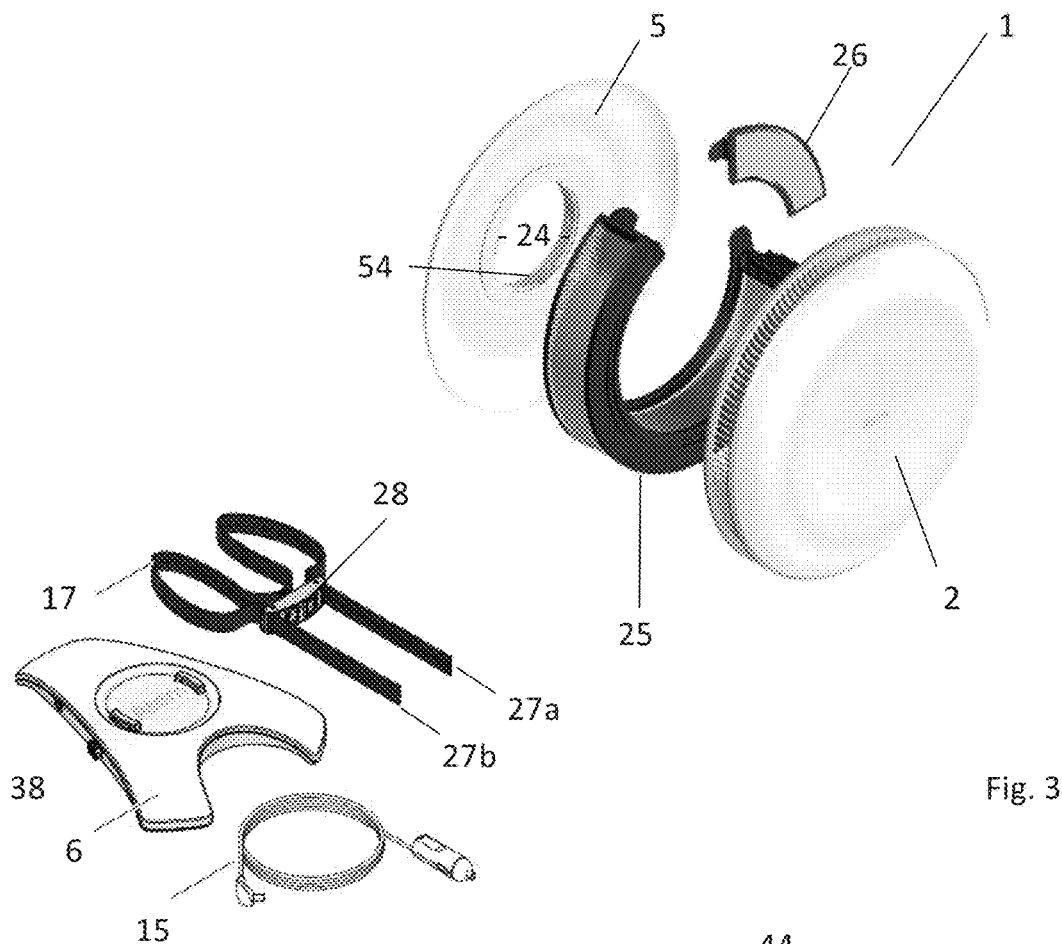
FIG. 3 shows a perspective view of the components of the device.

For assembly, the air purifier 1 is moved in the direction of the arrow 42 toward the front side 11 of the coupling sleeve 8 and slipped over the coupling sleeve 8, the coupling sleeve being received in the opening 24 of the device. The opening 24 is shown in FIG. 3, for example.

The coupling sleeve 8 has a side region 12 on which at least one locking jaw 13 is placed. When the air purifier 1 is put in place, this locking jaw 13 is first forced into the interior of the coupling sleeve 8 and then engages in the interior of the air purifier 1 in an annular undercut or locking projection 54 in the inner circumference of the opening 24.

In the example that is shown here, the adapter plate 6 consists of the three wings 14a, 14b, 14c, which—bent in the direction of the air purifier—extend in a star shape starting from the coupling sleeve 8.

A power cable 15 can be plugged into the adapter plate 6 via a connector 16 in order to supply the adapter plate 6 with power.

The adapter plate 6 can be connected and fixed to the head restraint bars 18 of a head restraint 19 by means of a belt 17. The air purifier 1 is mobile and can be placed on the adapter plate by hand 20.

Figure 2:
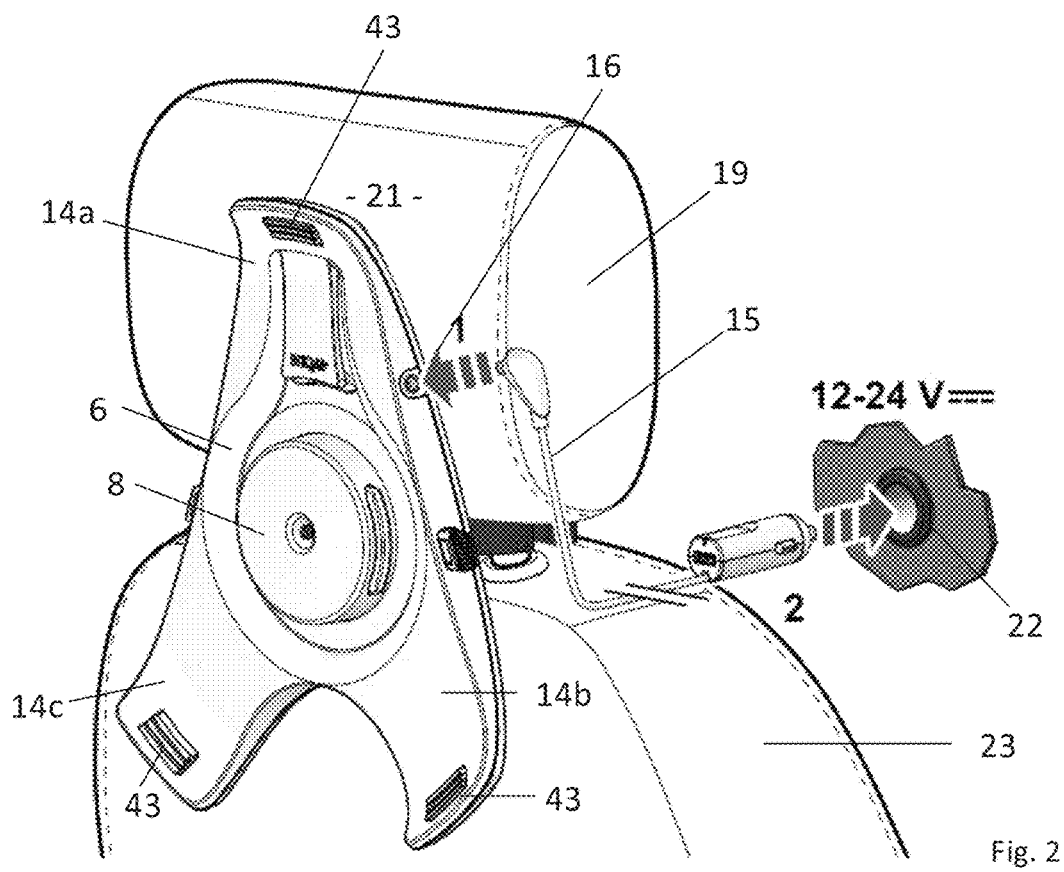
FIG. 2 shows a perspective view of the mounted adapter plate.

FIG. 2 shows only the adapter plate 6 with its three wings 14a, 14b, 14c, which extend in a star shape starting from the coupling sleeve 8. The invention is not limited to this. A number of two or more wings is also to be covered by the present invention.

The coupling sleeve 8 is bell-shaped, so that the air purifier 1 can be placed onto it with its opening 24. The individual wings 14 have rubber-like support pads 43 in their end regions that can engage in an annular opening of the back plate 5 in the vicinity of the outer circumference 4 in order to additionally fix the air purifier 1 in place and prevent inadvertent rotation.

The power cable 15 can be connected to the onboard power supply 22 of the vehicle a commercially available adapter plug.

FIG. 3 shows the individual components of the air purifier 1, which consists of the cover plate 2 and the back plate 5, which have received the filter unit 25 between them. The back plate 5 has an opening 24 into which the coupling sleeve 8 is inserted later. The adapter plate 6 can be connected to the head restraint bars 18 by means of the belt 17. The belt 17 has a buckle 28 for mounting, as will be discussed separately further below. The belt 17 has the ends 27a, 27b, which have already been guided through the buckle 28 in FIG. 3 and are present as free ends.

A discharge chamber 26 into which the fan wheel blows the air on the path toward the air discharge region 50 of the housing during operation is arranged in the portion left open by the filter unit 25.

Figure 4:
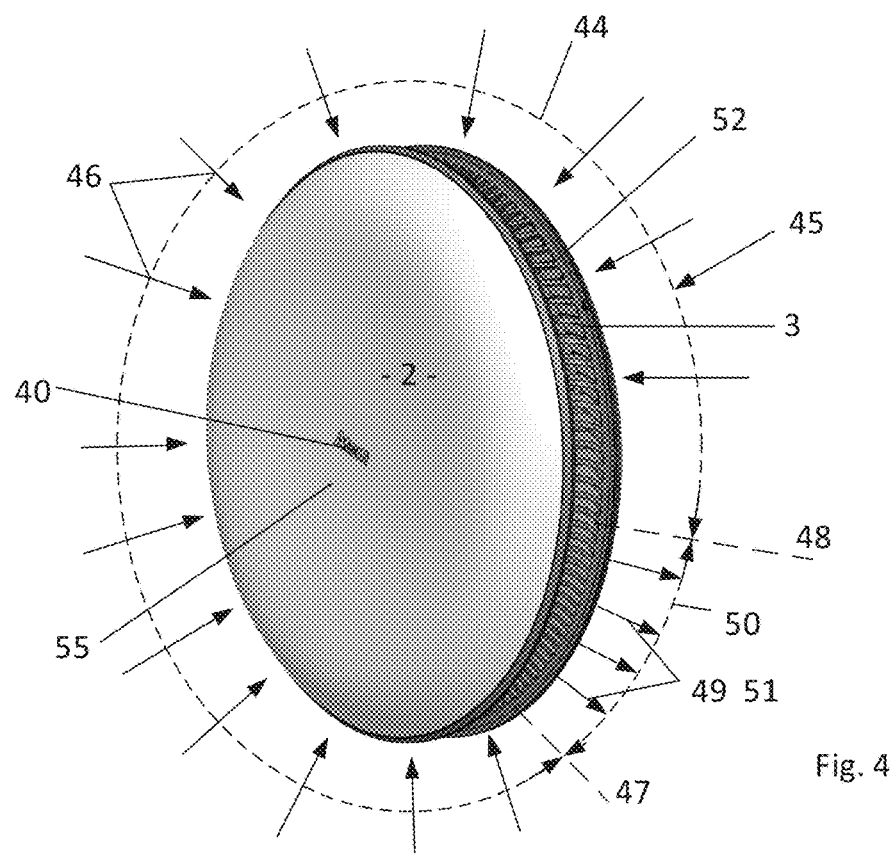
FIG. 4 shows a perspective view of the device.

FIG. 4 shows the housing, in which the intake air 44 is sucked into the interior via the air intake region 45, which is shown in dashed lines, via fins 3 that are arranged radially on the outer circumference.

The intake air 44 is thus sucked into the device 1 in the radial direction in the direction of arrow 46 via a circumferential region that extends in the range of from 270-300 degrees.

The circumferential region for the air intake extends from position 47 to position 48.

The air discharge region 50 thus extends in an angular range of preferably 60-90 degrees from position 48 to position 47.

The air flow that is blown out of the housing-side fins 3 in the vicinity of the air discharge region 50 is thus directed in the direction of the arrow 49.

This discharge flow 51 has such a low air velocity that it is practically unnoticed by the user, so a display light bar 52 is additionally provided in the vicinity of the housing-side fins 3 in order to enable the functioning of the air purifier to be verified.

The contact surface 55 integrated into the cover plate 2 responds to finger pressure. Through actuation thereof, the device can be switched on or the intensity of the discharge flow (51) can be regulated. At least one colored LED (not shown) is integrated into or behind the contact surface 55 in order to alert the user to the current operating state by means of different colors and intensities.

Figure 5:
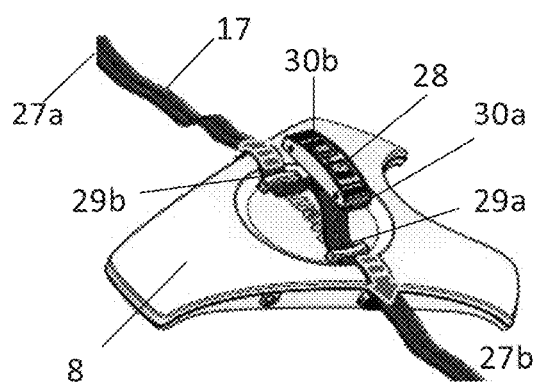
FIG. 5 shows a perspective view of the belt feedthrough on the adapter plate.

FIG. 5 shows the passage of the belt 17 through the back side of the adapter plate 6. The middle region of the belt 17 is securely connected to the buckle 28.

The belt 17 with its ends 27*a* and 27*b* is guided through the lugs 29*a*, 29*b* that extend on the rear side on the adapter plate.

Figure 6:
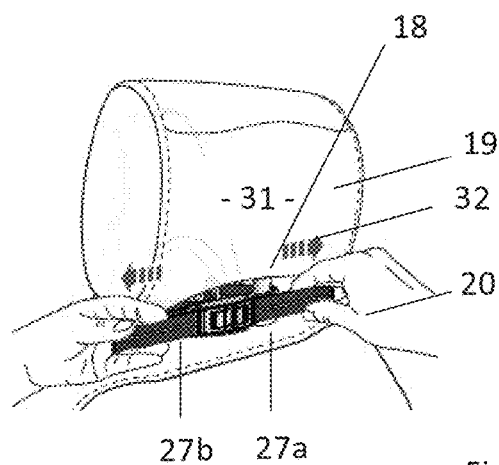
FIG. 6 shows a perspective view of the fixation of the belt.

The ends 27*a*, 27*b* wrap around the head restraint bars as shown in FIG. 6 and are fed back to the buckle 28 through the feedthrough with locking jaws 30*a*, 30*b*, where they are guided through corresponding openings and pulled tight in the direction of the arrow 32 and opposite to the direction of the arrow 32 in order to thus secure the adapter plate to the head restraint 19.

Figure 7:
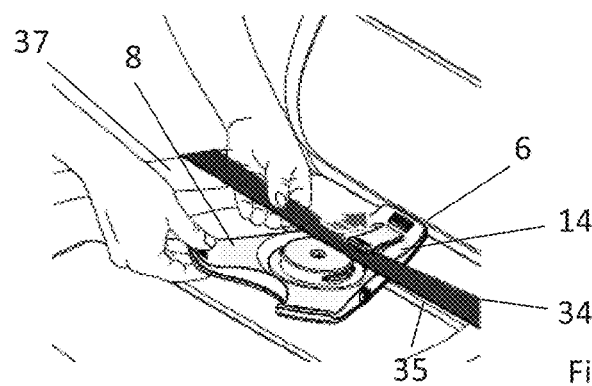
FIG. 7 shows a perspective view of the fixation of the adapter plate to the seating surface.

FIG. 7 shows an alternative mounting variant for the adapter plate 6, which can be mounted on the seat surface 37 in the example shown here. The adapter plate 6 is secured for this purpose by means of the belt 33, which is guided by a strap 34 of the adapter plate 6.

Figure 8:
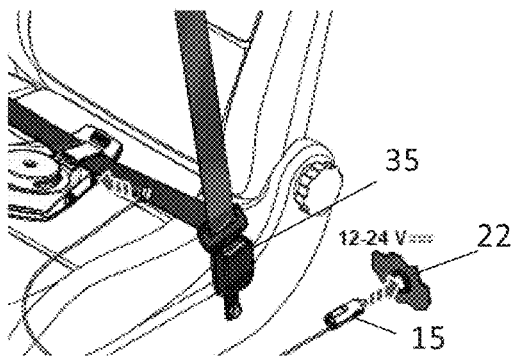
FIG. 8 shows a perspective view of the seating surface.

FIG. 8 shows how the belt 33 is inserted into the clasp 35 and the power plug 15 is connected to the on-board power supply 22.

Figure 9:
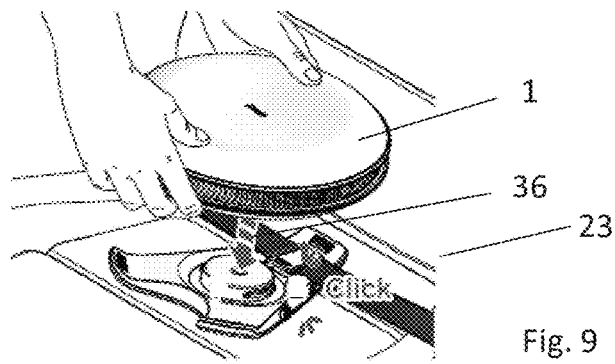
FIG. 9 shows schematized mounting of the device.

The air filter device 1 can then be set in place on the adapter plate 6 in the direction of the arrow 36, as shown in FIG. 9, with the device connecting to the coupling sleeve 8, and with the power supply of the air filter device 1 also being ensured by the power connection that is routed through the coupling sleeve.

FIG. 10 shows how the air purifier 1 according to the invention can be removed from the head restraint 19. For this purpose, a release button 38 that is present on the adapter plate 6 can be actuated, whereby the locking jaws 13 are disengaged from the opening 34 of the air purifier 1 and the air purifier 1 can thus be removed from the head restraint 19 in the direction of the arrow 39.

As is shown in FIG. 1, the release button 38 can be mounted on the side of the adapter plate 6, or also on the back of the adapter plate (not shown), from where it can be easily operated.

FIG. 11 shows how, after the removal of the air purifier 1, the adapter plate 6 now remains on the back of the seat or the head restraint 19.

FIG. 12 shows how the air purifier 1 can be opened during rotation of the cover plate 2 in the direction of the arrow 41 about the axis 40.

According to FIG. 13, after the cover plate 2 is opened, the filter unit 25 can be removed from the interior of the air purifier 1 by hand 20.

LIST OF REFERENCE SYMBOLS 1 air purifier
2 cover plate
3 fins
4 outer circumference
5 back plate
6 adapter plate
7 mounting portion
8 coupling sleeve
9 opening
10 jack plug
11 front side (of 8)
12 side region (of 8)
13 locking jaws
14 wings a, b, c
15 power cable
16 connector
17 belt a, b
18 head restraint rods
19 head restraint
20 hand
21 rear side (of 13)
22 on-board power supply
23 seat
24 opening
25 filter unit
26 discharge chamber
27 ends a, b (of 17)
28 buckle
29 lug a, b
30 feedthrough a, b
31 front side (of 19)
32 arrow direction
33 seat belt
34 strap
35 seat belt buckle
36 arrow direction
37 seating surface
38 release button
39 arrow direction
40 rotation axis
41 arrow direction
42 arrow direction
43 locking
44 intake air
45 air intake region
46 arrow direction
47 position
48 position
49 arrow direction
50 air discharge region
51 discharge flow
52 display light bar
53 arrow direction
54 locking projection
55 actuation surface

The invention claimed is:

1. An air purifier with a mount for a vehicle, wherein the air purifier comprises a fan in a portable housing, which has at least one air intake region for sucking air into the housing and at least one air discharge region for blowing the air out of the housing, with a cleaned discharge air flow flowing out into the passenger compartment, wherein the mount comprises an adapter plate that can be detachably fixed in different positions in the interior of the vehicle, and the air purifier is rotatably mounted in the adapter plate, and wherein the adapter plate for mounting the air purifier has a coupling sleeve that is configured to be locked in an opening in an interior of the air purifier.

2. The air purifier as set forth in claim 1, wherein the coupling sleeve is bell-shaped.

3. The air purifier as set forth in claim 2, wherein a locking closure is integrated into the coupling sleeve and can be unlocked by an adapter plate-side release button.

4. The air purifier as set forth in claim 3, wherein, the locking closure comprises one or more locking jaws, the back plate comprises one or more locking projections, and wherein through actuation of an adapter plate-side release button, the one or more locking jaws are disengaged from the one or more locking projections of the air purifier.

5. The air purifier as set forth in claim 1, wherein the adapter plate can be mounted on head restraint bars of an automobile seat by at least one belt.

6. The air purifier as set forth in claim 1, wherein the adapter plate can be mounted on a seating surface of a seat by a vehicle-side seat belt.

7. The air purifier as set forth in claim 1, wherein the adapter plate has at least two wings that extend in the radial direction and support the air purifier on a back side and secure the air purifier in place.

8. The air purifier as set forth in claim 1, further comprising a jack plug is positioned in an opening of the adapter plate that engages in a jack socket in a back plate of the positioned air purifier and serves the function of a power supply.

9. The air purifier as set forth in claim 1, wherein, as seen from a fan rotation axis, the air intake region and the air discharge region are arranged on the outer circumference of the housing, and that, as seen from the fan rotation axis, the air intake region and the air discharge region are arranged in mutually different regions of the outer circumference of the housing.

10. The air purifier as set forth in claim 1, wherein the housing has a succession of fins in the air intake region and/or in the air discharge region, it being possible for air to be sucked into the housing between the fins in the air intake region and for air to be blown out of the housing between the fins in the air discharge region.

\* \* \* \* \*